United States Patent
Yamamura et al.

(10) Patent No.: US 10,462,315 B2
(45) Date of Patent: Oct. 29, 2019

(54) IMAGE READING APPARATUS

(71) Applicant: Konica Minolta, Inc., Chiyoda-ku, Tokyo (JP)

(72) Inventors: Akira Yamamura, Toyokawa (JP); Shogo Asaoka, Toyokawa (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 57 days.

(21) Appl. No.: 15/806,909

(22) Filed: Nov. 8, 2017

(65) Prior Publication Data
US 2018/0131825 A1  May 10, 2018

(30) Foreign Application Priority Data
Nov. 9, 2016  (JP) .................... 2016-218787

(51) Int. Cl.
H04N 1/04 (2006.01)
H04N 1/00 (2006.01)
(Continued)

(52) U.S. Cl.
CPC ..... *H04N 1/00559* (2013.01); *H04N 1/02835* (2013.01); *H04N 1/0301* (2013.01);
(Continued)

(58) Field of Classification Search
CPC .......... H04N 1/00559; H04N 1/02835; H04N 1/0301; H04N 1/0306; H04N 1/02825;
(Continued)

(56) References Cited

U.S. PATENT DOCUMENTS 4,547,663 A * 10/1985 Kitagishi ............... G03B 3/10
250/201.2
4,839,514 A *  6/1989 Mine .................... H04N 1/03
250/208.1
(Continued)

FOREIGN PATENT DOCUMENTS

CN     102197636 A    9/2011
EP     2 166 743 A1   3/2010
(Continued)

OTHER PUBLICATIONS

First Office Action dated Feb. 12, 2019, by the State Intellectual Property Office of People's Republic of China in corresponding Chinese Patent Application No. 201711089984.5 and an English translation of the Office Action. (18 pages)
(Continued)

*Primary Examiner* — Cheukfan Lee
(74) *Attorney, Agent, or Firm* — Buchanan Ingersoll & Rooney PC

(57) ABSTRACT

An image reading apparatus includes a light source that emits light in a main scanning direction to a subject to be read, a light receiving unit that receives light reflected by the subject to be read, and an optical system that images the light reflected by the subject to be read and guides the light to the light receiving unit. The optical system includes a reflector mirror that reflects the light reflected by the subject to be read, and an optical element that is disposed adjacent to the reflector mirror and images the light reflected by the subject to be read. The optical element is held by the reflector mirror.

11 Claims, 4 Drawing Sheets

(51) Int. Cl.
*H04N 1/028* (2006.01)
*H04N 1/03* (2006.01)

(52) U.S. Cl.
CPC ......... *H04N 1/0305* (2013.01); *H04N 1/0306* (2013.01); *H04N 1/02825* (2013.01); *H04N 2201/0081* (2013.01); *H04N 2201/02458* (2013.01); *H04N 2201/02477* (2013.01)

(58) Field of Classification Search
CPC . H04N 2201/0081; H04N 2201/02458; H04N 2201/02477
USPC ...... 358/475, 509, 482, 483; 250/208.1, 216
See application file for complete search history.

(56) References Cited

U.S. PATENT DOCUMENTS

| | | | | |
|---|---|---|---|---|
| 5,019,703 A | * | 5/1991 | Boyd | G02B 27/0018 250/208.1 |
| 5,109,154 A | * | 4/1992 | Higashihara | G02B 7/346 250/201.8 |
| 6,833,904 B1 | * | 12/2004 | Komatsuda | G03F 7/70108 355/53 |
| 2011/0164413 A1 | | 7/2011 | Yamada et al. | |
| 2018/0262638 A1 | * | 9/2018 | Ohzawa | H04N 1/0305 |
| 2019/0045073 A1 | * | 2/2019 | Murase | H04N 1/1937 |
| 2019/0045074 A1 | * | 2/2019 | Murase | H04N 1/1937 |
| 2019/0045075 A1 | * | 2/2019 | Murase | H04N 1/19531 |

FOREIGN PATENT DOCUMENTS

| | | |
|---|---|---|
| JP | 2001-250989 A | 9/2001 |
| JP | 2009-244500 A | 10/2009 |
| JP | 2015-159444 A | 9/2015 |

OTHER PUBLICATIONS

Extended European Search Report dated Mar. 12, 2018, issued by the European Patent Office in corresponding European Application No. 17200284.2. (8 pages).

* cited by examiner

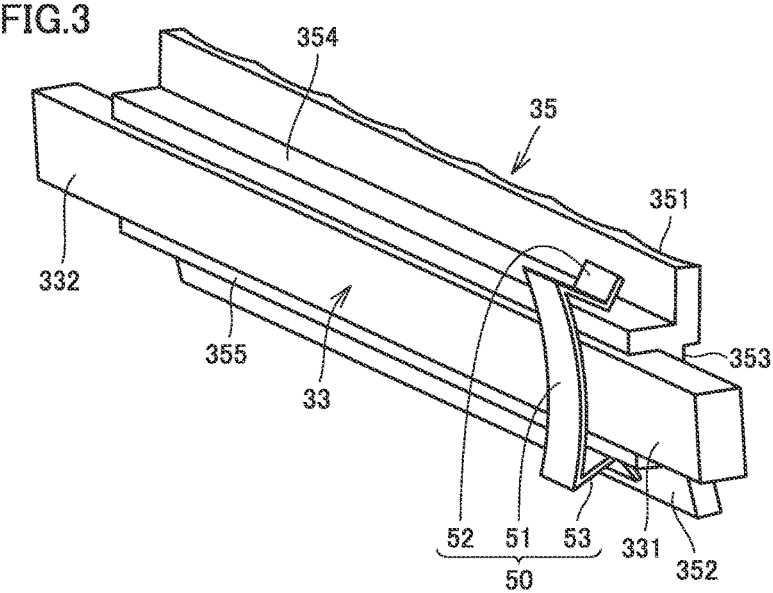
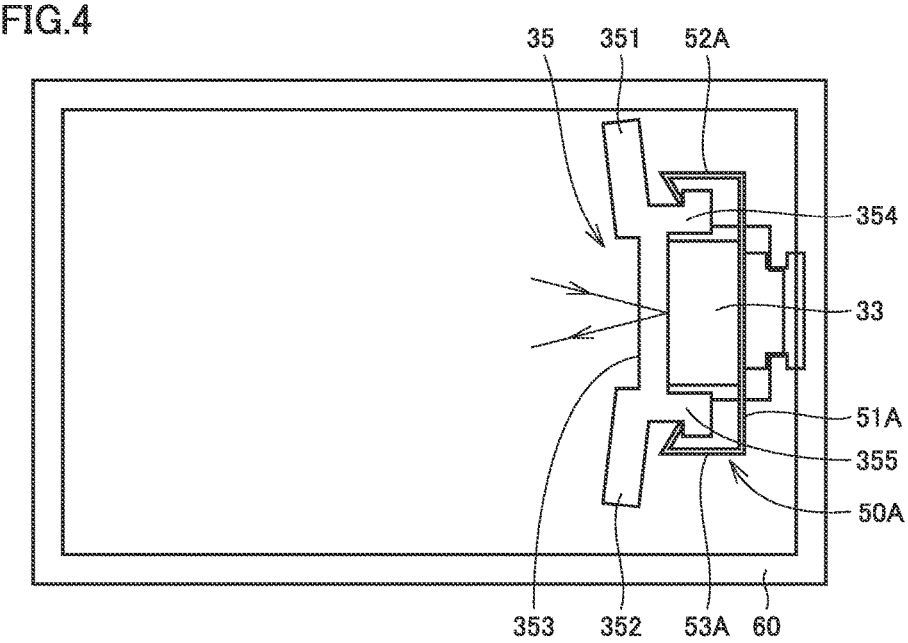

IMAGE READING APPARATUS

Japanese Patent Application No. 2016-218787 filed on Nov. 9, 2016, including description, claims, drawings, and abstract the entire disclosure is incorporated herein by reference in its entirety.

BACKGROUND

Technological Field

The present invention relates to an image reading apparatus that reads an image of a subject to be read to obtain an image signal.

Description of the Related Art

As an example of a conventional image reading apparatus, there exists what is called a CIS sensor (contact image sensor) using a gradient index lens array. The CIS image sensor irradiates an original document with the light from an LED and images a reflection of light from the original document by a lens array referred to as SELFOC (registered trademark) producing an erect real image to thus read image information.

The CIS image sensor using the SELFOC (registered trademark) lens array is called a pupil-dividing optical system and is an optical system that collects light from a plurality of lenses for one point. Therefore, when the original document is positionally slightly changed, an image from an adjacent lens is offset and thus overlaps, resulting in a narrowed depth of field.

Accordingly, as an image reading apparatus capable of making depth of field greater, Japanese Laid-Open Patent Publication No. 2009-244500 discloses an image reading apparatus having an optical system using a reflector mirror array. When an optical system using a reflector mirror array is used, it is necessary to dispose a plurality of reflector mirrors and a plurality of lenses. For this reason, it is required to position an optical element with high precision in order to ensure performance.

An image reading apparatus allowing an optical element to be positioned with high precision and constantly keeping a relative position in a direction of depth in a longitudinal direction of an imaging optical system without causing self-weight deflection or warpage, is disclosed for example in Japanese Laid-Open Patent Publication No. 2015-159444. In the image reading apparatus disclosed in Japanese Laid-Open Patent Publication No. 2015-159444, individual optical elements are aligned on a base, and a spacing between a reflecting plate and a base plate is adjusted by using a spacing maintaining member.

A holding mechanism capable of holding a light emitting element array substrate with high precision is disclosed in, for example, Japanese Laid-Open Patent Publication No. 2001-250989. In the holding mechanism described in Japanese Laid-Open Patent Publication No. 2001-250989, a light emitting element array substrate on which a light emitting element array composed of a plurality of linearly disposed light emitting elements is mounted is held to follow a flat glass plate. This can suppress warpage of the substrate caused due to deflection and temperature variation.

SUMMARY

However, the image reading apparatus disclosed in Japanese Laid-Open Patent Publication No. 2015-159444, as has been described above, has individual optical elements disposed on a base and uses a spacing maintaining member to adjust a spacing between a reflecting plate disposed to face a base portion and the base, and the image reading apparatus thus has a complicated configuration.

The holding mechanism disclosed in Japanese Laid-Open Patent Publication No. 2001-250989 requires adding a flat glass plate which is considerably long in the longitudinal direction, resulting in an increased number of parts and an increased cost.

The present invention has been made in view of the above issues, and an object thereof is to provide an image reading apparatus allowing an optical element to be positioned with high precision in a simple configuration.

To achieve at least one of the abovementioned objects, according to an aspect of the present invention, an image reading apparatus reflecting one aspect of the present invention comprises: a light source that emits light in a main scanning direction to a subject to be read; a light receiving unit that receives light reflected by the subject to be read; and an optical system that images the light reflected by the subject to be read and guides the light to the light receiving unit, the optical system including a reflector mirror that reflects the light reflected by the subject to be read, and an optical element that is disposed adjacent to the reflector mirror and images the light reflected by the subject to be read, the optical element being held by the reflector mirror.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a perspective view showing a rear side of a portion of the optical system included in the image reading apparatus shown in FIG. 1.

FIG. 4 is a schematic cross-sectional view for illustrating a first exemplary variation of a pressing member shown in FIG. 3.

DETAILED DESCRIPTION OF EMBODIMENTS

Hereinafter, one or more embodiments of the present invention will be described with reference to the drawings. However, the scope of the invention is not limited to the disclosed embodiments. In the following embodiments, identical or common components are identically denoted in the figures and will not be described repeatedly.

First Embodiment

Figure 1:
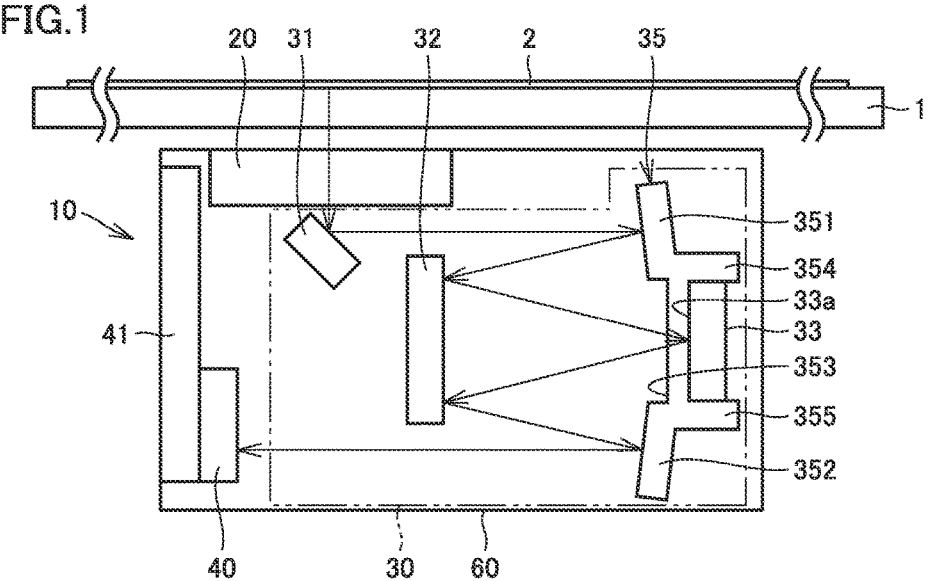
FIG. 1 is a schematic cross-sectional view of an image reading apparatus according to a first embodiment.

FIG. 1 is a schematic cross-sectional view of an image reading apparatus according to a first embodiment. With reference to FIG. 1, an image reading apparatus 10 according to the first embodiment will be described.

As shown in FIG. 1, image reading apparatus 10 according to the first embodiment emits light from a light source 20 to an original document 2 placed on a platen glass 1 as a subject to be read, and receives a reflection of light from the original document by a light receiving unit 40 which converts the received reflection of light photoelectrically to thus read an image. Image reading apparatus 10 comprises light source 20, light receiving unit 40, an optical system 30, and a housing 60.

Light source 20 emits light to a subject to be read in a main scanning direction (a direction perpendicular to the plane of FIG. 1). Light source 20 can for example be an illumination unit using an LED or the like.

Light receiving unit 40 receives light reflected by original document 2. Light receiving unit 40 photoelectrically converts the received light. Light receiving unit 40 can be an image pickup device such as a semiconductor sensor or the like. Light receiving unit 40 is mounted on a circuit board 41. Circuit board 41 is provided with a signal processing circuit or the like to process a photoelectrically converted signal.

Optical system 30 images the light reflected by original document 2 and guides it to light receiving unit 40. Optical system 30 includes a plurality of reflector mirrors 31, 32, 33 for reflecting the light reflected by the original document, and an optical element 35 for imaging the light reflected by original document 2.

When viewed in the main scanning direction, the plurality of reflector mirrors 31, 32, 33 are aligned in a sub-scanning direction (a rightward/leftward direction in FIG. 1). The plurality of reflector mirrors 31, 32, 33 can for example be planar reflector mirrors. For example, reflector mirror 31 has an upper end side inclined in a direction away from reflector mirror 32 with respect to the vertical direction. Reflector mirrors 32, 33 are disposed in parallel in the main scanning direction and the vertical direction, for example. Reflector mirrors 32 and 33 face each other in the sub-scanning direction.

Optical element 35 includes a lens portion and a connecting portion 353. The lens portion includes a first lens portion 351 and a second lens portion 352. First lens portion 351 and second lens portion 352 are aligned in a direction corresponding to the sub-scanning direction. Specifically, first lens portion 351 and second lens portion 352 are aligned in the vertical direction, for example.

Connecting portion 353 connects first lens portion 351 and second lens portion 352. Specifically, connecting portion 353 connects a lower end portion of first lens portion 351 and an upper end portion of second lens portion 352. Connecting portion 353 is in the form of a plate. Connecting portion 353 is disposed parallel to the main scanning direction and the vertical direction.

Optical element 35 is held by reflector mirror 33. More specifically, optical element 35 is bonded at a back surface side of connecting portion 353 of optical element 35. Connecting portion 353 is fixed to reflector mirror 33, which is located on a front side in a direction in which light incident toward connecting portion 353 travels.

The lens portion of optical element 35 and reflector mirror 33 are aligned in the vertical direction. This can reduce or prevent adhesion of a vertically falling foreign matter to optical element 35 and reflector mirror 33.

Optical element 35 is a reflective imaging member. Optical element 35 is composed of a resin member. First lens portion 351 and second lens portion 352 constitute an imaging system for imaging the light reflected by an original document.

The light reflected by original document 2 is reflected by reflector mirror 31 toward first lens portion 351 of optical element 35. The light reflected toward first lens portion 351 and incident on first lens portion 351 is reflected toward reflector mirror 32 while being reduced by first lens portion 351.

The light reflected toward reflector mirror 32 is limited by a later-described opening 356 (see FIG. 3) provided in connecting portion 353, and is thus incident on reflector mirror 33. The light incident on reflector mirror 33 is reflected and passes through opening 356 and thus travels toward reflector mirror 32.

The light incident on reflector mirror 32 is reflected toward second lens portion 352. The light reflected toward second lens portion 352 and incident on second lens portion 352 is reflected toward light receiving unit 40 while being reduced by second lens portion 352.

Housing 60 accommodates optical system 30 therein. Housing 60 is configured to be movable in the sub-scanning direction (a direction indicated in FIG. 1 by an arrow DR1). Image information of original document 2 can be read by moving housing 60 in the sub-scanning direction and guiding the light that is reflected from original document 2 to light receiving unit 40 by optical system 30, as described above.

Figure 2:
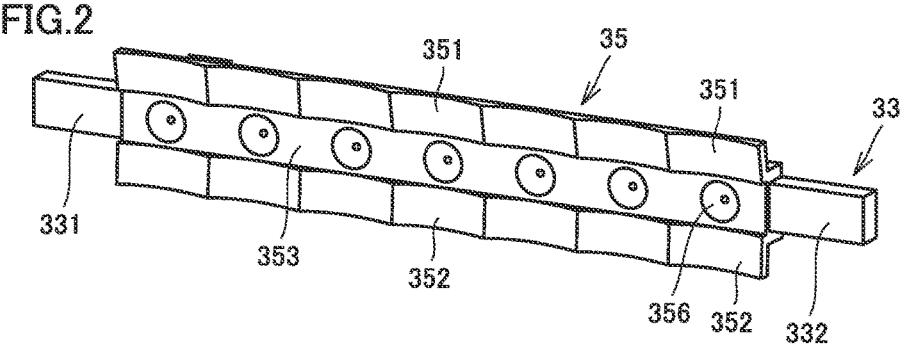
FIG. 2 is a perspective view showing a front side of a portion of an optical system included in the image reading apparatus shown in FIG. 1.

FIG. 2 is a perspective view showing a front side of a portion of the optical system included in the image reading apparatus shown in FIG. 1. FIG. 3 is a perspective view showing a rear side of a portion of the optical system included in the image reading apparatus shown in FIG. 1. With reference to FIGS. 2 and 3, a specific shape of optical element 35 and a structure fixing optical element 35 and reflector mirror 33 will be described.

As shown in FIGS. 2 and 3, optical system 30 includes a portion in which optical element 35 is held by and integrated with reflector mirror 33. Optical element 35 extends in a direction corresponding to the main scanning direction. Optical element 35 has an elongate shape.

Optical element 35 includes a plurality of first lens portions 351 and a plurality of second lens portions 352 as a plurality of lens portions. The plurality of first lens portions 351 are disposed in a row. For example, the plurality of first lens portions 351 are aligned in a direction corresponding to the main scanning direction.

The plurality of second lens portions 352 are disposed in a row in a direction parallel to the direction in which the plurality of first lens portions 351 are aligned. The plurality of second lens portions 352 are aligned in a direction corresponding to the main scanning direction. The plurality of second lens portions 352 are each disposed to be associated with one of the plurality of first lens portions 351. First lens portion 351 and second lens portion 352 associated with each other are aligned in a direction corresponding to the sub-scanning direction (in the vertical direction in the present embodiment).

The plurality of first lens portions 351 and the plurality of second lens portions 352 are connected by connecting portion 353. Connecting portion 353 has a plurality of openings 356. The plurality of openings 356 are aligned in a direction corresponding to the main scanning direction.

The plurality of openings 356 are each disposed between an associated first lens portion 351 and an associated second lens portion 352. The plurality of openings 356 each pass light which is reduced and thus reflected by an associated first lens portion 351 and reflected by reflector mirror 32. Opening 356 limits the light reflected by reflector mirror 32 and traveling toward light receiving unit 40. Opening 356 is provided to have a diameter reduced toward reflector mirror 33.

As described above, optical element 35 held at reflector mirror 33 that has opening 356 allows a position of a stop for limiting light to be determined with precision.

Furthermore, as reflector mirror 33 is located on the front side relative to connecting portion 353 in the direction in which light incident toward connecting portion 353 travels, and reflects light having passed through opening 356, and opening 356 is used as a reflective aperture, a space required for ensuring an optical path can be reduced.

Optical element 35 further includes a first wall portion 354 and a second wall portion 355. First wall portion 354 is connected to a lower end portion of the plurality of first lens portions 351. First wall portion 354 projects toward a side opposite to reflector mirror 32 with first lens portion 351 interposed. First wall portion 354 is in the form of a plate. First wall portion 354 extends in a direction corresponding to the main scanning direction.

Second wall portion 355 is connected to an upper end portion of the plurality of second lens portions 352. Second wall portion 355 projects toward a side opposite to reflector mirror 32 with second lens portion 352 interposed. Second wall portion 355 is in the form of a plate. Second wall portion 355 is disposed parallel to first wall portion 354 and extends in a direction corresponding to the main scanning direction. Second wall portion 355 is spaced from first wall portion 354 in a direction corresponding to the sub-scanning direction.

The plurality of first lens portions 351, the plurality of second lens portions 352, connecting portion 353, first wall portion 354, and second wall portion 355 are integrally molded by, for example, injection-molding using a resin member.

Reflector mirror 33 is disposed between first wall portion 354 and second wall portion 355. Reflector mirror 33 is in the form of a plate. Reflector mirror 33 extends in a direction corresponding to the main scanning direction. Reflector mirror 33 is fixed to connecting portion 353 at a side opposite to reflector mirror 32 with connecting portion 353 interposed.

Reflector mirror 33 has protruding portions 331 and 332 protruding from optical element 35. More specifically, protruding portions 331 and 332 protrude from optical element 35 in a direction corresponding to the main scanning direction. Protruding portions 331 and 332 are held by a holding portion (not shown) provided in housing 60. In this manner, while reflector mirror 33 is held by housing 60, optical element 35 is held by reflector mirror 33, and optical element 35 can thus be positioned with precision. Further, deflection of optical element 35 and reflector mirror 33 when they are assembled can be suppressed.

Image reading apparatus 10 further comprises a pressing member 50 that presses reflector mirror 33 toward optical element 35.

Pressing member 50 is disposed on a side opposite to a path of light reflected by a reflecting surface 33a of reflector mirror 33 (see FIG. 1). Pressing member 50 thus disposed can be prevented from interfering with the optical path.

Pressing member 50 includes a leaf spring portion 51 serving as a biasing portion, and first and second pinching portions 52 and 53 serving as an attachment portion. Leaf spring portion 51 extends in a direction corresponding to the sub-scanning direction. Leaf spring portion 51, in an attached state in which pressing member 50 is attached to optical element 35, is biased so as to press reflector mirror 33 against connecting portion 353.

First and second pinching portions 52 and 53 are provided at opposite ends of leaf spring portion 51. First and second pinching portions 52 and 53 are biased toward each other.

Reflector mirror 33 is disposed between first wall portion 354 and second wall portion 355 and in that condition first wall portion 354 and second wall portion 355 are inserted between first pinching portion 52 and second pinching portion 53 to attach pressing member 50 to optical element 35. On this occasion, leaf spring portion 51 exerts a biasing force to press reflector mirror 33 toward connecting portion 353. Optical element 35 is thus firmly fixed to reflector mirror 33.

Thus, image reading apparatus 10 according to the first embodiment has a configuration in which optical element 35 of resin disposed adjacent to reflector mirror 33 of glass and imaging the light reflected by a subject to be read is held by reflector mirror 33. By thus holding optical element 35 of resin lower rigidity than glass by reflector mirror 33 of glass high in rigidity and configured with high precision, warpage of optical element 35 per se and deflection thereof when it is assembled can be suppressed. The optical element can thus be positioned with high precision in a simple configuration. Furthermore, reflector mirror 33 that is a planar reflector mirror allows optical element 35 to follow a plane of high precision and thus be positioned with higher precision.

In addition, when optical element 35 that is of a reflective type severer against surface shape error than a transmissive type, as has been described above, is held on reflector mirror 33, the optical element can be positioned with high precision more effectively.

Furthermore, even when optical element 35 extends in the longitudinal direction and tends to warp, optical element 35 with a plurality of lens portions and the like formed integrally, that is held on reflector mirror 33, can be positioned with high precision more effectively.

Note that pressing member 50 may be configured in first and second exemplary variations as described below.

(First Exemplary Variation of Pressing Member)

Figure 5:
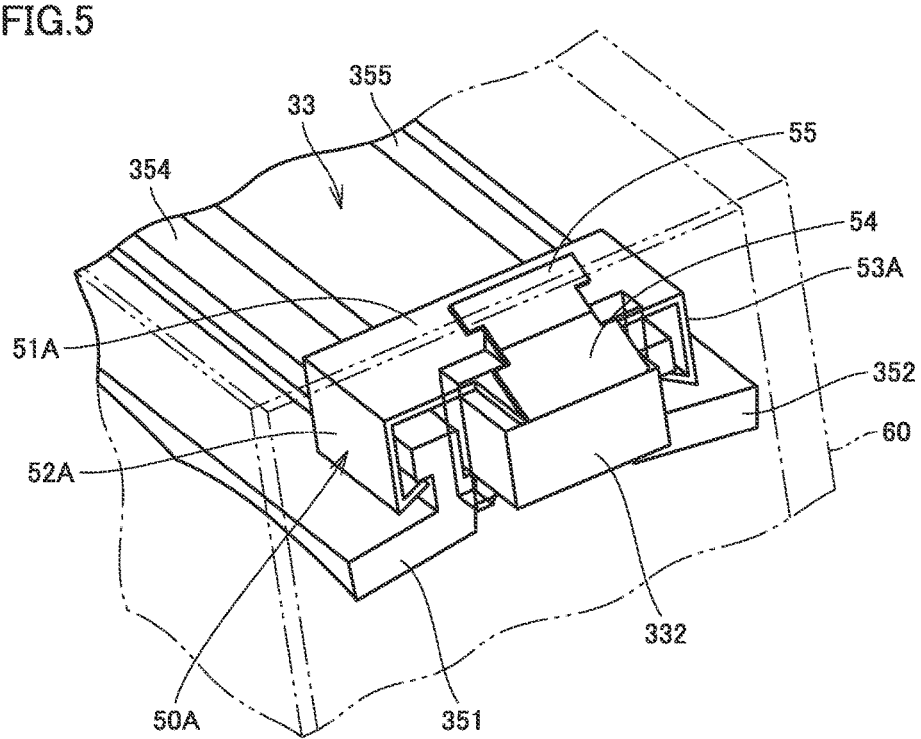
FIG. 5 is a perspective view for illustrating the first exemplary variation of the pressing member shown in FIG. 3.

FIG. 4 is a schematic cross-sectional view for illustrating a first exemplary variation of a pressing member shown in FIG. 3. FIG. 5 is a perspective view for illustrating the first exemplary variation of the pressing member shown in FIG. 3. With reference to FIG. 4 and FIG. 5, a pressing member 50A according to the first exemplary variation will be described.

As shown in FIGS. 4 and 5, pressing member 50A has a plate portion 51A, a first hook portion 52A and a second hook portion 53A serving as an attachment portion, a leaf spring portion 54 serving as a biasing portion, and an engaging portion 55.

Plate portion 51A extends in a direction corresponding to the sub-scanning direction. Plate portion 51A bridges first wall portion 354 and second wall portion 355. First hook portion 52A and second hook portion 53A are provided at opposite ends of plate portion 51A. First hook portion 52A is configured to be capable of being hooked on first wall portion 354. Second hook portion 53A is configured to be capable of being hooked on second wall portion 355.

Leaf spring portion 54 is provided at a midsection of plate portion 51A. Leaf spring portion 54 projects in the main scanning direction of plate portion 51A and is bent in a direction away from plate portion 51A. Leaf spring portion 54 is folded back so that in an attached state in which pressing member 50A is attached to optical element 35 reflector mirror 33 is biased toward connecting portion 353.

Reflector mirror 33 is disposed between first wall portion 354 and second wall portion 355 and in that condition first hook portion 52A is hooked on first wall portion 354 and second hook portion 53A is hooked on second wall portion 355 to attach pressing member 50 to optical element 35. On this occasion, leaf spring portion 54 exerts a biasing force to press reflector mirror 33 toward connecting portion 353. Optical element 35 is thus firmly fixed to reflector mirror 33.

Engaging portion 55 is configured to be capable of engaging an engaged portion provided to housing 60. By attaching pressing member 50 to optical element 35, and in that condition, attaching engaging portion 55 to the engaged portion, reflector mirror 33 and optical element 35 can be held more stably.

(Second Exemplary Variation of Pressing Member)

Figure 6:
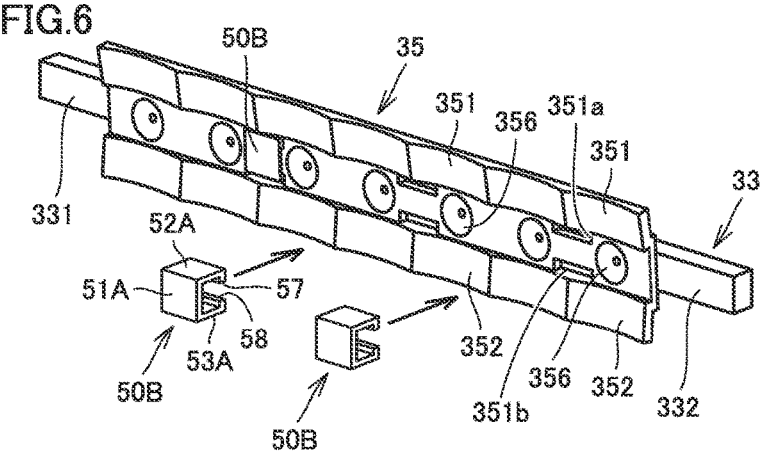
FIG. 6 is a perspective view for illustrating a second exemplary variation of the pressing member shown in FIG. 4.

FIG. 6 is a perspective view for illustrating a second exemplary variation of the pressing member shown in FIG. 4. With reference to FIG. 6, a pressing member 50B according to the second exemplary variation will be described.

As shown in FIG. 6, pressing member 50B is configured to be insertable into connecting portion 353. Pressing member 50B has plate portion 51A, and first hook portion 52A and second hook portion 53A.

Plate portion 51A has a rectangular shape. Plate portion 51A is disposed between first lens portion 351 and second lens portion 352 in a direction corresponding to the sub-scanning direction. Plate portion 51A, in a state where pressing member 50B is attached, abuts against connecting portion 353 at a side opposite to reflector mirror 33 with connecting portion 353 interposed.

First hook portion 52A and second hook portion 53A are provided at opposite ends of plate portion 51A. First hook portion 52A is configured to be insertable into an insertion hole 353a provided through connecting portion 353. First hook portion 52A has a first claw portion 57. First claw portion 57 is configured to be capable of catching a main surface of reflector mirror 33 located on a side opposite to a main surface of reflector mirror 33 facing connecting portion 353.

Second hook portion 53A faces first hook portion 52A in a direction corresponding to the sub-scanning direction. Second hook portion 53A is configured to be insertable into an insertion hole 353b provided through connecting portion 353. Insertion hole 353b and insertion hole 353a are aligned in a direction corresponding to the sub-scanning direction. Second hook portion 53A has a second claw portion 58. Second claw portion 58 is configured to be capable of catching a main surface of reflector mirror 33 located on a side opposite to a main surface of reflector mirror 33 facing connecting portion 353.

First hook portion 52A is inserted through insertion hole 353a and second hook portion 53A is inserted into insertion hole 353b and in that condition, first claw portion 57 and second claw portion 58 catch the reflector mirror, so that a pressing force acts between plate portion 51A and first and second claw portions 57 and 58. Thus, pressing member 50B presses reflector mirror 33 toward connecting portion 353. As a result, optical element 35 is firmly fixed to reflector mirror 33.

As described above, by firmly fixing optical element 35 to reflector mirror 33 by using pressing member 50, pressing member 50A according to the first exemplary variation, or pressing member 50B according to the second exemplary variation, deflection can be suppressed even when a thermal expansion difference occurs between optical element 35 of resin and reflector mirror 33 of glass in use.

Second Embodiment

Figure 7:
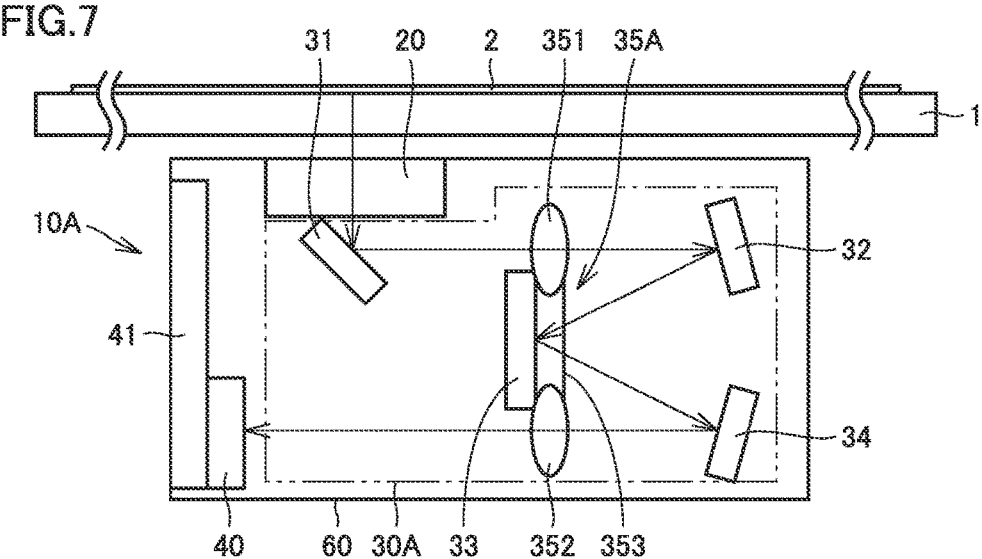
FIG. 7 is a schematic diagram of an image reading apparatus according to a second embodiment.

FIG. 7 is a schematic diagram of an image reading apparatus according to a second embodiment. With reference to FIG. 7, an image reading apparatus 10A according to the second embodiment will be described.

As shown in FIG. 7, image reading apparatus 10A according to the second embodiment is different in that an optical system 30A is configured using a transmissive optical element 35A. The remainder in configurations is substantially the same.

Optical system 30A images the light reflected by original document 2 and guides it to light receiving unit 40. Optical system 30A includes a plurality of reflector mirrors 31, 32, 33, 34 for reflecting the light reflected by the original document, and optical element 35A for imaging the light reflected by original document 2.

Reflector mirrors 31, 32, 33 are aligned in the sub-scanning direction. Reflector mirrors 33 and 34 are aligned in the vertical direction.

Optical element 35A includes a lens portion and connecting portion 353. The lens portion includes first lens portion 351 and second lens portion 352. First lens portion 351 and second lens portion 352 are aligned in a direction corresponding to the sub-scanning direction. Specifically, first lens portion 351 and second lens portion 352 are aligned in the vertical direction, for example.

Connecting portion 353 connects first lens portion 351 and second lens portion 352. Specifically, connecting portion 353 connects a lower end portion of first lens portion 351 and an upper end portion of second lens portion 352. Connecting portion 353 is in the form of a plate. Connecting portion 353 is disposed parallel to the main scanning direction and the vertical direction.

Optical element 35A is held by reflector mirror 33. More specifically, optical element 35A is bonded at a back surface side of connecting portion 353 of optical element 35A. Connecting portion 353 is fixed to reflector mirror 33, which is located on a front side in a direction in which light incident toward connecting portion 353 travels.

Optical element 35A is a transmissive imaging member. Optical element 35A is composed of a resin member. First lens portion 351 and second lens portion 352 constitute an imaging system for imaging the light reflected by an original document.

The light reflected by original document 2 is reflected by reflector mirror 31 toward first lens portion 351 of optical element 35A. The light reflected toward first lens portion 351 and incident on first lens portion 351 travels toward reflector mirror 32 while being reduced by first lens portion 351.

The light transmitted through first lens portion 351 and incident on reflector mirror 32 is reflected toward reflector mirror 33. The light reflected toward reflector mirror 33 is limited by opening 356 provided in connecting portion 353, and is thus incident on reflector mirror 32. The light incident on reflector mirror 32 is reflected and passes through opening 356 and thus travels toward reflector mirror 34.

The light incident on reflector mirror 34 is reflected toward second lens portion 352. The light incident on second lens portion 352 travels toward light receiving unit 40 while being reduced by second lens portion 352.

Thus, image reading apparatus 10A according to the second embodiment has a configuration in which optical element 35A of resin disposed adjacent to reflector mirror 33 of glass and imaging the light reflected by a subject to be read is held by reflector mirror 33. Thus image reading apparatus 10A according to the second embodiment can also provide an effect substantially equivalent to that of the first embodiment.

Note that the number of reflector mirrors included in the optical system and that of optical elements are not limited to those described in the first or second embodiment, and can be changed, as appropriate, within a range which does not depart from the gist of the present invention insofar as a reflection of light from original document 2 can be guided to the light receiving unit.

While in the first and second embodiments a case where the lens portion includes a plurality of first lens portions 351 and a plurality of second lens portions 352 has been described by way of example, this is not exclusive, and it is sufficient that the lens portion includes one of the plurality of first lens portions 351 and the plurality of second lens portions 352. In that case, one of the plurality of first lens portions 351 and the plurality of second lens portions 352 is fixed to reflector mirror 33.

While in the first and second embodiments a case where the plurality of first lens portions 351 and the plurality of second lens portions 352 are integrally formed by injection molding has been described as an example, this is not exclusive, and each of first lens portions 351 and each of second lens portions 352 may be formed separately insofar as they are fixed to the optical element.

While in the first and second embodiments a case where protruding portions 331 and 332 of reflector mirror 33 protrude from optical element 35 in a direction corresponding to the main scanning direction has been described as an example, this is not exclusive, and they may protrude in a direction traversing the direction corresponding to the main scanning direction in a range in which they do not interfere with the light guided to light receiving unit 40. In that case also, the protruding portions are held by a holding portion provided in housing 60.

Although embodiments of the present invention have been described and illustrated in detail, it is clearly understood that the same is by way of illustration and example only and not limitation, the scope of the present invention should be interpreted by terms of the appended claims.

What is claimed is:

1. An image reading apparatus comprising:
    a light source that emits light in a main scanning direction to a subject to be read;
    a light receiving unit that receives light reflected by the subject to be read; and
    an optical system that images the light reflected by the subject to be read and guides the light to the light receiving unit,
    the optical system including a reflector mirror of glass and an optical element of resin that is disposed adjacent to the reflector mirror and images the light reflected by the subject to be read,
    the optical element being held by the reflector mirror.

2. The image reading apparatus according to claim 1, further comprising a pressing member that presses the reflector mirror toward the optical element, wherein the pressing member is used to fix the optical element and the reflector mirror.

3. The image reading apparatus according to claim 2, further comprising a housing that houses the optical system therein, wherein
    the pressing member has an engaging portion that engages the housing, and
    by the engaging portion engaging the housing, the pressing member is supported by the housing.

4. The image reading apparatus according to claim 2, wherein
    the reflector mirror has a reflecting surface for reflecting light, and
    the pressing member is disposed on a side opposite to a path of light reflected by the reflecting surface.

5. The image reading apparatus according to claim 1, further comprising a housing that houses the optical system therein, wherein
    the reflector mirror has a protruding portion protruding from the optical element, and
    the protruding portion is held by the housing.

6. The image reading apparatus according to claim 1, wherein
    the optical element includes a lens portion that images the light reflected by the subject to be read, and a connecting portion,
    the lens portion has a first lens portion and a second lens portion aligned in a direction corresponding to a sub-scanning direction,
    the connecting portion connects the first lens portion and the second lens portion,
    the reflector mirror is disposed between the first lens portion and the second lens portion in a direction corresponding to the sub-scanning direction, and
    the connecting portion is attached to the reflector mirror.

7. The image reading apparatus according to claim 1, wherein
    the optical element includes a lens portion that images the light reflected by the subject to be read, and a traversing portion connected to the lens portion to be positioned in a direction corresponding to a sub-scanning direction with respect to the lens portion, and provided to be capable of traversing light traveling toward the light receiving unit, and
    the traversing portion has an opening that limits the light traveling toward the light receiving unit.

8. The image reading apparatus according to claim 7, wherein the reflector mirror is located on a front side relative to the traversing portion in a direction in which light incident toward the traversing portion travels, and the reflector mirror reflects light having passed through the opening.

9. The image reading apparatus according to claim 1, wherein
    the optical element has a lens portion that images the light reflected by the subject to be read, and
    the lens portion and the reflector mirror are aligned in a vertical direction.

10. The image reading apparatus according to claim 1, wherein the optical element is a reflective imaging member.

11. The image reading apparatus according to claim 1, wherein
    the optical element includes a plurality of lens portions that image the light reflected by the subject to be read and are aligned in a direction corresponding to the main scanning direction, and
    the plurality of lens portions are integrally formed.

* * * * *